W. SEWELL & A. S. CAMERON.

A. S. CAMERON for himself, and Assignee by mesne assignments, of S. BLATCHFORD, A. S. CAMERON, and CAROLINE M. SEWELL, Executors of WM. SEWELL, Dec'd.

DIRECT ACTING STEAM-PUMP.

No. 7,425. Reissued Dec. 12, 1876.

Fig. 1.

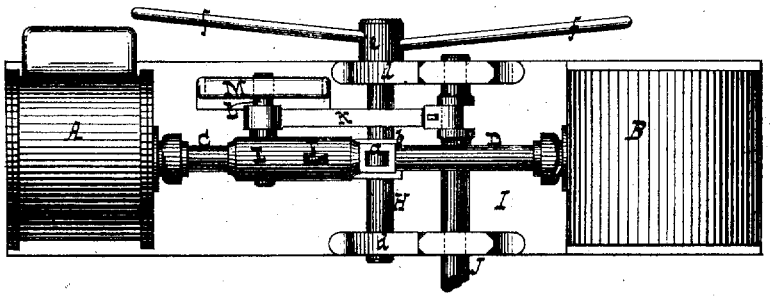

Fig. 2.

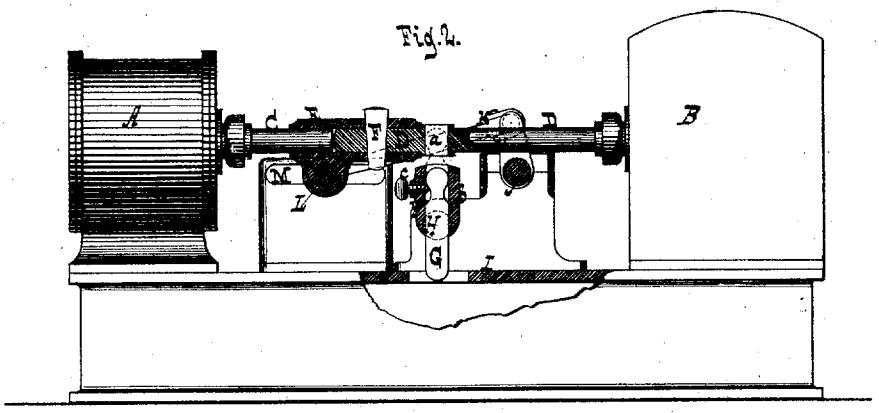

Witnesses

Otto Muhland

Robt. E. Miller

Inventors.

Adam S Cameron assignee of William Sewell and Adam S Cameron by Van Santvoord & Hauff their attorneys

THE GRAPHIC CO. N.Y.

UNITED STATES PATENT OFFICE.

ADAM S. CAMERON, OF NEW YORK, N. Y., FOR HIMSELF, AND ASSIGNEE, BY MESNE ASSIGNMENTS, OF SAMUEL BLATCHFORD, ADAM S. CAMERON, AND CAROLINE M. SEWELL, EXECUTORS OF WILLIAM SEWELL, DECEASED.

IMPROVEMENT IN DIRECT-ACTING STEAM-PUMPS.

Specification forming part of Letters Patent No. 42,693, dated May 10, 1864; reissue No. 1,731, dated July 19, 1864; reissue No. 7,425, dated December 12, 1876; application filed October 11, 1876.

*To all whom it may concern:*

Be it known that WILLIAM SEWELL and ADAM S. CAMERON, both of the city, county, and State of New York, invented a new and useful Improvement in Direct-Action Steam-Pumps, which improvement is fully set forth in the following specification, reference being had to the accompanying drawing, in which—

Figure 1 represents a plan view. Fig. 2 is a side view, partly in section.

Similar letters indicate corresponding parts.

In such places where steam-pumps are used it has been very desirable, or absolutely necessary, to provide separate hand-pumps besides the steam-pump, there being many purposes for which a hand-pump is required—as for pumping in or out of the boiler—and particularly on steam-vessels, for pumping out bilge-water, washing decks in port, and in other cases when steam is down and the steam-pumps cannot be used. The ordinary hand-pumps require separate connections, which, together with the additional expense for the hand-pump, and with the whole system of pipes of the steam-pump, make a complicated and costly arrangement. It has also been necessary to provide a separate steam-engine for various purposes on steam-vessels.

The invention which forms the subject-matter of this present application for a patent consists in the combination of a hand-gear with the piston-rod of a direct-action steam-pump, so that the pump can be operated by hand or by steam, and thereby the necessity of separate hand-pumps is avoided.

The steam-pump represented has a fly-wheel shaft connected with its steam-cylinder in the manner claimed in William Sewell's Letters Patent of November 4, 1862, No. 36,862. It will be seen that when the pump-piston is detached, as hereinafter described, there will remain all the parts of a complete steam-engine, capable of operating in the ordinary way, for any purpose desired.

The invention further consists in the combination of a detachable connection with the rods of the steam and water pistons, said rods being made separate one from the other, so that said rods may be disconnected, and the machine used as a steam-engine or hand-pump independent of each other. It also consists in the combination of a socket serving as a guide for the rod of the water-piston when the pump is worked separate from the engine, while said socket also serves to connect the two piston-rods when the machine is to be used as a steam-pump.

In the drawing, the letter A designates the steam-cylinder, and the letter B the water-cylinder. Each of these cylinders is fitted with a suitable piston or plunger, and these pistons are connected to each other by a rod, C D, which transmits the power from the steam-piston directly to the piston or plunger of the water-cylinder. With the rod C D, which connects the steam-piston with the water-piston, is combined a hand-gear, for the purpose of operating the machine as a hand-pump. The hand-gear represented in the drawing consists of a rock-shaft, H, which is arranged below and transversely to the rod C D, in suitable bearings *d d*, supported upon the bed-plate I of the pump, and it is provided with a toe or arm, G, which engages with a slot, *a*, formed in the rod C D. One end of said rock-shaft is made with an enlarged head, *e*, in which holes are provided for the insertion of a hand lever or bar, *f*, (one or more,) to work the pump by hand. J is the fly-wheel shaft, and K the rod which connects the crank of said shaft with the cross-head L, that moves in the guide M. The present invention is not, however, limited in its application to the kind of steam-pumps shown, but, as is obvious, may be applied to all direct-action steam-pumps.

In order to be able to use the steam-engine separate from the pumping-cylinder, and also to work the hand-pump with the least possible resistance, the rod C D, which connects the steam and water pistons, is made in sections, the section C being secured to the steam-piston, and the section D to the water-piston. These two sections are connected by means of a socket, E, which is firmly secured in any suitable manner to the head of the section C, and into which a portion of the section D is fitted snugly but easily, the length of the so fitted portion of the said section and the corresponding portion of the socket being a little greater than the length of the stroke of the pistons, so that when the section D is disconnected from the section C, and the machine is operated as a hand-pump, the socket E forms a guide for the pump-rod D, and preserves a rectilinear motion of the pump-piston.

The rod D can be secured in the socket E by a key, F, inserted through slots in the said rod and socket, such connection being made when the machine is to be worked as a direct-action steam-pump. When the pump is to be worked by hand, or when the steam-engine is to be employed for some purpose other than that of working the pumps, the key F is knocked out, or otherwise withdrawn, to disconnect the sections C D. If the pump is constructed as shown in the drawing, and if it is desired to work the same by hand, this can be effected by disconnecting the connection-rod K without disconnecting the sections C D; but it is obvious that more power will be required in this case than when the pump-rod D is disconnected from the steam-piston rod C.

The toe or arm G is fitted into a socket, *b*, in the rock-shaft H, and when the pump is worked by steam said arm can be withdrawn out of gear with the slot *a* in the piston-rod C D. When it is desired to work the pump by hand with the least possible expenditure of power, the key F is withdrawn, the steam-piston is moved back as far as possible into its cylinder, the arm G is moved upward into the slot *a* of the piston-rod D, as shown in dotted lines in Fig. 2, and the levers or bars *f f* are inserted into the rock-shaft. The pump is then worked by one or more men at each lever or bar.

What I claim as new, and desire to secure by Letters Patent, is—

1. The combination, in a direct-acting steam-pump in which the steam and pump pistons are in a direct line with each other, of the main piston-rod with a detachable lever, whereby the pump can be operated by hand, substantially as described.

2. The combination of a detachable connection with the rods of the steam and water pistons of a direct-acting steam-pump, said rods being made separate, one from the other, so that these rods can be disconnected, and the machine used as a steam-engine or hand-pump independent of each other, substantially as herein set forth.

3. The combination of a socket, E, with the steam-piston rod C and the water-piston rod D of a direct-acting steam-pump, said socket being firmly secured to the rod C, and forming a guide for the rod D when the pump is worked by hand, substantially as described.

In testimony that I claim the foregoing I have hereunto set my hand and seal this 9th day of October, 1876.

A. S. CAMERON. [L. S.]

Witnesses:

W. HAUFF,

E. F. KASTENHUBER.